Patented May 14, 1929.

1,713,475

UNITED STATES PATENT OFFICE.

KAORU MATSUMIYA AND HISAKAZU NAKATA, OF KYOTO, JAPAN.

PROCESS OF PREPARING SALVARSAN.

No Drawing. Application filed January 12, 1927, Serial No. 160,770, and in Japan May 1, 1926.

This invention relates to a process of preparing salvarsan by electrolytic reduction, characterized by the fact that the cathode solution comprises a solution of hydrochloric acid from 4.7 normal up to the purest or 39% density, to which 3-nitro-4-hydroxyphenylarsinic acid is added. It has for its object to obtain economically pure salvarsan without requiring any subsequent treatment.

Salvarsan can be obtained by reducing 3-nitro-4-hydroxyphenylarsinic acid with a reducing agent, for example hydrosulphite, but the product thus obtained always contains impurities, the principal impurity being sulphur which sometimes amounts to three percent. (See J. Amer. Chem. Soc., Vol. 44, P. 847: Ber. D. Chem. Ges., Vol. 44, P. 1265: J. Chem. Soc., Vol. 117, P. 370 and Vol. 119, P. 1416.) Another process was proposed in the German Patent No. 270,568, which comprises electrolytic reduction of 3-nitro-4-hydroxyphenylarsinic acid without employing any reducing agent. According to the specification of the German patent, the mixture of 300 volumes of alcohol, 200 volumes of 25% hydrochloric acid and 500 volumes of water, the strength of hydro-chloric acid being about 5%, is used as cathode solution. The reduced material thus obtained is a white substance which is considered to be an arsine compound, and no further investigation is disclosed in the specification.

When 3-nitro-4-hydroxyphenylarsinic acid is reduced with a reducing agent, material is produced in the following order:
1. 3-amino-4-hydroxyphenylarsinic acid,
2. 3-amino-4-hydroxyphenylarsinic oxide,
3. 3, 3'-diamino-4, 4'-dihydroxyarsenobenzene, (salvarsan base),
4. 3-amino-4-hydroxyphenylarsine.

If an experiment is made similar to the steps disclosed in the German specification, 3-amino-4-hydroxyphenylarsine, that is the last product above mentioned is produced, and arsine gas is emitted in the course of the reduction notwithstanding the specification describes that arsenic is not split off.

After a long investigation the inventor discovered that the reduced product is largely affected by the nature of cathode and the strength of hydro-chloric acid used as cathode solution. It has been demonstrated that when the reduction is carried out using mercury, lead or amalgamated lead as cathode and a solution comprising hydro-chloric acid and 3-nitro-4-hydroxyphenylarsinic acid is employed as cathode solution, a transparent solution of 3-amino-4-hydroxyphenylarsine is produced following Equation 1, if the strength of hydrochloric acid is weaker than 4.7 normal, while a faint yellowish deposit of 3, 3'-diamino-4, 4'-dihydroxyarsenobenzine dihydrochloride or salvarsan is produced following Equation 2 if the hydrochloric acid is stronger than 4.7 normal.

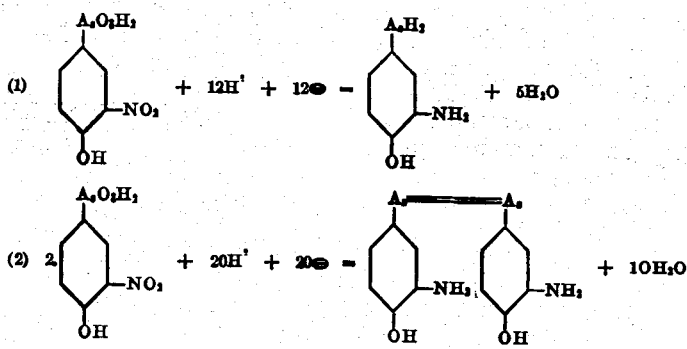

When the mixture of hydrochloric acid with methylalcohol or ethylalcohol is used instead of hydrochloric acid in the above step, by same effect is perceived and salvarsan can be obtained provided that the strength of hydrochloric acid of the mixed solution is 4.7 normal or more.

The product thus obtained is pure salvarsan and does not require any subsequent treatments as the known process which employs a reducing agent does, so that there is no chance to get impurities from a solvent used in such treatments or for the product to be oxidized by contact with air in course of the treatments.

In carrying out this process mercury, lead or amalgamated lead is used as cathode, while platinum is used as anode, and a porous cell is used as diaphragm. The cathode solution should be a solution of hydrochloric acid or the mixture of hydrochloric acid and methylalcohol or ethylalcohol, the strength of hydrochloric acid being 4.7 normal or more and the anode solution should be a solution of hydrochloric acid of any strength. After a proper quantity of 3-nitro-4-hydroxyphenylarsinic acid is added to the cathode solution which is well stirred, electric current of a cathodic density of .1 to .3 amperes per square cm. is passed through the electrolyte. In course of the reduction a yellowish substance is gradually deposited, and the current should be passed until the precipitation is completed, the precipitate being next filtered. The reducing and the filtering steps are carried out in an atmosphere of nitrogen, hydrogen or carbon dioxide, because the cathode solution and the precipitate are required to be free from air.

The precipitate separated is next dried in vacuum. The yellowish powder thus obtained is soluble in water or acid, and an analysis proves it to be pure salvarsan.

More detailed explanation of this invention will be made hereinafter by way of examples.

*Example 1.*—Three grams of 3-nitro-4-hydroxyphenylarsinic dissolved in 120 c. c. of 22% hydrochloric acid is used as cathode solution, and 22% hydrochloric acid is used as anode solution. The cathode is composed of mercury with a surface of 12.5 sq. c. m. and the anode is composed of platinum. Electric current of 0.16 ampere per sq. c. m. of the cathode is passed. Yellowish precipitates are gradually produced in the transparent yellow cathode solution. These precipitates are treated after the step above mentioned.

*Example 2.*—Ten grams of 3-nitro-4-hydroxyphenylarsinic acid dissolved in a mixture of 60 c. c. of hydrochloric acid of 1.19 specific gravity with 60 c. c. of ethylalcohol is used as cathode solution and 22% hydrochloric acid is used as anode solution. The cathode is composed of mercury while the anode is composed of platinum, and electric current of 0.2 ampere per sq. cm. of the cathode is passed for about five hours.

*Example 3.*—Three grams of 3-nitro-4-hydroxyphenylarsinic acid dissolved in a mixture of 60 c. m. of methylalcohol with 60 c. m. of hydrochloric acid of 1.19 specific gravity is used as cathode solution. The remaining particulars are the same as Example 1.

*Example 4.*—Five grams of 3-nitro-4-hydroxyphenylarsinic acid suspended in a mixture of 55 c. c. of hydrochloric acid of 1.19 specific gravity with 75 c. c. of water is used as cathode solution, while 19% hydrochloric acid is used as anode solution. Electric current of 2 amperes is passed to the electrodes, cathode being mercury, anode being platinum. In course of the reduction, the suspended nitro-hydroxyphenylarsinic acid gradually dissolves and the yellow precipitates of salvarsan formed. Meantime the cathode solution should be stirred. Since the suspended 3-nitro-4-hydroxyphenylarsinic acid and the precipitate of salvarsan can be distinguished by their color, the passing of current is continued until the precipitate of salvarsan no longer appears. The precipitates of salvarsan are then filtered and dried.

Claims:

1. A cathode solution for the preparation of salvarsan by electric reduction, comprising a solution of hydrochloric acid of the strength more than 4.7 normal, and 3-nitro-4-hydroxyphenylarsinic acid.

2. A cathode solution used for the preparation of salvarsan by electric reduction, comprising a mixture of a solution of hydrochloric acid and alcohol, the strength of the hydrochloric acid being more than 4.7 normal, in which is dissolved a quantity of 3-nitro-4-hydroxyphenylarsinic acid.

In testimony whereof we hereunto affix our signatures.

KAORU MATSUMIYA.
HISAKAZU NAKATA.